Figure 1:
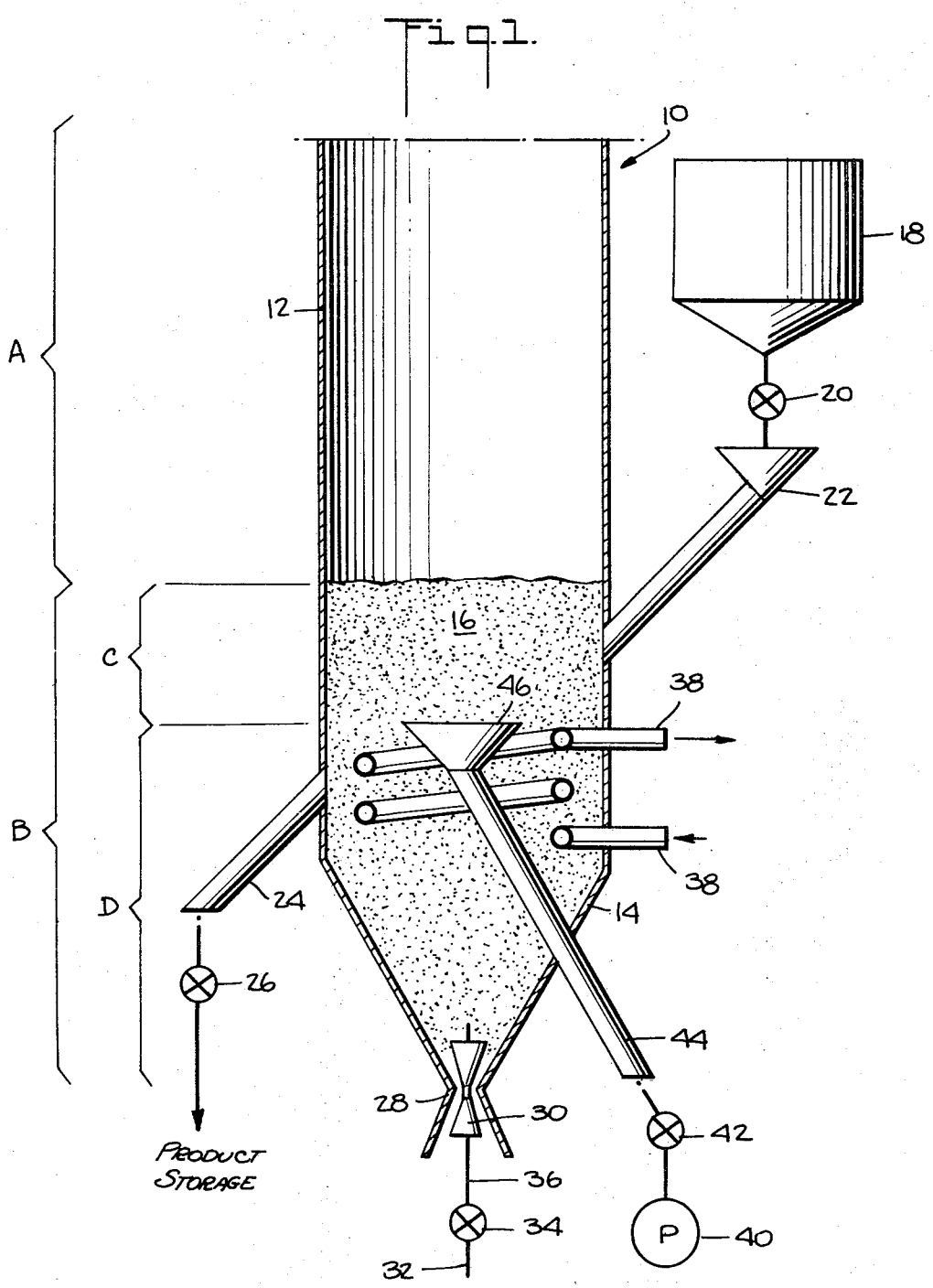

United States Patent [19]
Robinson

[11] 3,800,740
[45] Apr. 2, 1974

[54] APPARATUS FOR DECOMPOSITION OF METAL CARBONYLS

[75] Inventor: Ronald Dale Robinson, Port Colborne, Ontario, Canada

[73] Assignee: The International Nickel Company, Inc., New York, N.Y.

[22] Filed: Dec. 14, 1972

[21] Appl. No.: 315,109

Related U.S. Application Data
[62] Division of Ser. No. 154,853, June 21, 1971.

[52] U.S. Cl.............................. 118/48, 118/DIG. 5
[51] Int. Cl............................................. C23c 13/08
[58] Field of Search........................... 118/48–49.5, 118/DIG. 5, 303; 117/107.1, 107.2 R, 100 R, 100 A, 100 B, 100 M, 100 C, 100 D, 100 S, DIG. 6; 239/132.3

[56] References Cited
UNITED STATES PATENTS

| | | | |
|---|---|---|---|
| 2,399,717 | 5/1946 | Aryeson | 117/100 A |
| 2,506,317 | 5/1950 | Rex | 117/100 B |
| 2,648,609 | 8/1953 | Wurster | 117/DIG. 6 |
| 3,001,228 | 9/1961 | Nack | 117/DIG. 6 |
| 3,112,274 | 11/1963 | Morgenthaler et al. | 117/100 R UX |
| 3,136,705 | 6/1964 | Sommers | 117/DIG. 6 |
| 3,252,823 | 5/1966 | Jacobson et al. | 117/117.2 R |
| 3,566,830 | 3/1973 | Flamm | 118/48 |
| 3,605,685 | 9/1971 | West et al. | 118/48 |

Primary Examiner—Morris Kaplan

[57] ABSTRACT

Fluid bed reactors for decomposing metal carbonyls and comprising a vertically disposed, elongated vessel for confining a bed of fluidized particulate material are provided with heating coils, that can be heat exchange coils through which heating fluid is passed or electrical resistance heating coils, in the lower part of the reactor and fluidized bed so that the lower portion of the fluidized bed functions as a heating region while the upper portion functions as a decomposing zone. The lower and upper portions of the fluidized bed are volumetrically proportioned to provide substantially equal gas velocities to promote conveyance of heated particulate material from the heating region to the decomposing region. A process for decomposing metal carbonyls is also disclosed in which separate heating and decomposing regions in a fluidized bed are established and a metal carbonyl is introduced into the decomposing region via a water-cooled lance to be decomposed on heated particulate material.

3 Claims, 2 Drawing Figures

APPARATUS FOR DECOMPOSITION OF METAL CARBONYLS

The present application is a division of my application Ser. No. 154,853 filed June 21, 1971.

The present invention is particularly useful for decomposing metal carbonyls, such as nickel tetracarbonyl or iron pentacarbonyl, and will be described in conjunction therewith; but the present invention has much wider applicability. For example, the present invention can be employed to coat particulate material with a vaporous component by condensing and solidifying the vaporous component on the particulate material.

Proposing to take advantage of the excellent gas-solid contact inherent in fluidized beds, various processes for thermally decomposing metal carbonyls in fluid bed reactors have been developed. The thermal decomposition of metal carbonyls is an endothermic process, and the problem most commonly encountered has been the manner in which heat is supplied to the fluid bed reactor.

Carbon monoxide, one of the products of metal carbonyl decomposition, is also employed to dilute metal carbonyls in order that decomposition can be more easily controlled. At temperatures below 1,300°F. carbon monoxide is unstable and disproportionates to carbon dioxide and elemental carbon. The rate of carbon monoxide disproportionation is imperceptible at room temperature but accelerates with increasing temperatures and at metal carbonyl decomposition temperatures the rate of disproportionation is sufficiently high to cause carbon contamination problems. Thus, localized regions of high temperatures within the decomposition chamber must be avoided if carbon contamination of the carbonyl metal product is to be minimized.

It has been suggested that fluidized beds be indirectly heated by supplying heat through the reactor walls. Although fluidized beds provide excellent heat transfer, particularly between the suspended particulate material and the fluidizing gas, it has been found that heat transfer from the reactor walls to the fluidized bed is inefficient. It has been postulated that a thin gaseous film or lamellar flow of gases is created between the reactor walls and the fluidized bed and that the film or lamellar flow inhibits heat transfer from the reactor wall to the fluidized bed. In some instances, measurable temperature differentials of 80°F. and higher have been recorded. If, during the thermal decomposition of metal carbonyls, the walls of a fluid bed reactor must be maintained at unduly high temperatures in order to supply the requisite heat for the endothermic decomposition, the possibility of carbon monoxide disproportionation is increased. In fact, it has been noted in the prior art that carbon associated with carbonyl metal powders produced in fluid bed reactors can be traced to the higher temperatures at the reactor walls.

In order to overcome the problems associated with inefficient heat transfer through reactor walls, it has been suggested to preheat the particulate material to be coated and/or the fluidizing gas, e.g., carbon monoxide. It has also been suggested that the particulate material be maintained in the fluidized state and at proper temperature by employing a preheated suspension of particulate material in a fluidizing gas. Merely preheating the fluidizing gas outside of the fluid bed reactor offers no guarantee that the carbonyl metal product will be carbon free since carbon monoxide can disproportionate in the preheater and the disproportionation products can be carried into the reactor with the same undesired result as though the disproportionation had occurred in the fluid bed reactor. Moreover, preheating the fluidizing gas is quite inefficient because the heat capacity of gases are volumetrically far less than the heat capacity of solids. Preheating the particulate material creates burdensome materials-handling problems and requires that particulate material be continually removed from the reactor, not in response to the production rate, but wholly in response to the heat requirements. The use of a preheated suspension of particulate material in the fluidizing gas to supply heat, although the expedient works reasonably well, requires additional materials-handling equipment and more floor space. This expedient, if not closely controlled, can produce carbon via carbon monoxide disproportionation in the preheater. Although attempts were made to avoid the foregoing problems and disadvantages, none, as far as I am aware, was entirely successful when carried into commercial practice on an industrial scale.

It has now been discovered that metal carbonyls, including nickel carbonyl and iron carbonyl, can be thermally decomposed in specially designed fluid bed reactors while the production of carbon via the disproportionation of carbon monoxide is minimized.

It is an object of the present invention to provide an apparatus for thermally decomposing metal carbonyls in fluid bed reactors.

Another object of the present invention is an apparatus for the production of carbonyl metal powders in fluid bed reactors while minimizing carbon contamination.

Yet another object of the present invention is the provision of a fluid bed reactor especially adapted for the decomposition of metal carbonyls.

An even further object of the present invention is to provide an apparatus for controlling the heat input to a fluid bed reactor.

Figure 2:
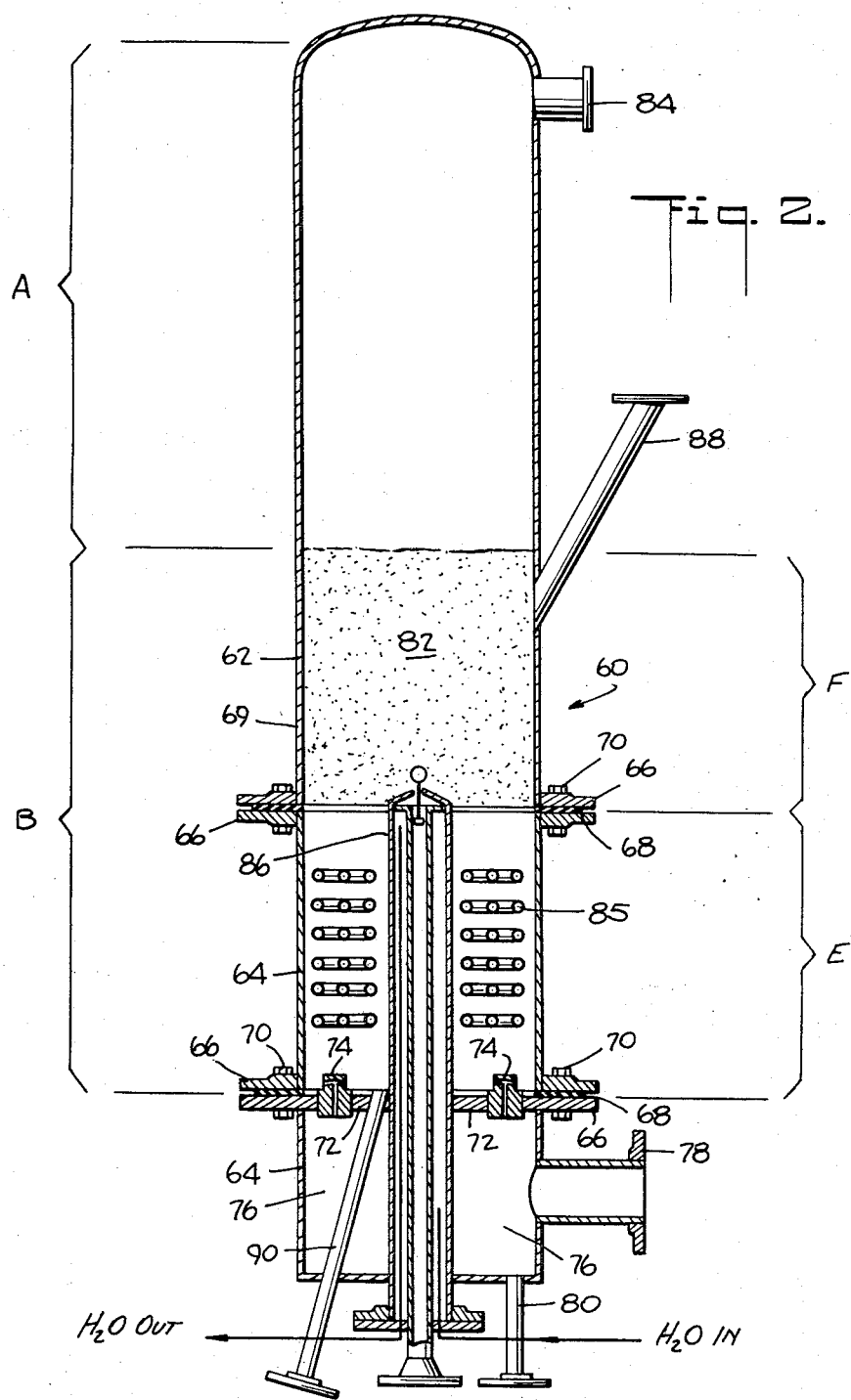

Other objects and advantages will become apparent from the following description taken in conjunction with the drawings in which:

FIG. 1 is a longitudinal section of a fluid bed reactor in accordance with the present invention; and FIG. 2 is a longitudinal section of an advantageous embodiment of a fluid bed reactor in accordance with the present invention that can be employed for decomposing metal carbonyls.

Generally speaking, the present invention contemplates improved fluid bed apparatus. The fluid bed reactor comprises a vertically disposed, elongated vessel that defines a lower fluidizing zone for confining a fluidized bed of particulate material and an upper particulate-material disengaging zone with the fluidizing zone having a lower heat exchange region and an upper particulate-material-treating region. The reactor is provided with inlet and outlet means for feeding and discharging particulate material to and from the fluidizing zone. The reactor is also provided with a fluidizing gas inlet for introducing fluidizing gas into the fluidizing zone to fluidize particulate material contained therein. Heat exchange means are located in the heat exchange region of the fluidizing zone to maintain particulate material in the fluidizing zone at preselected temperatures. Fluid substances for treating particulate material is introduced into the treating region of the fluidizing zone by fluid inlet means so that the particulate material is treated by the fluid before being discharged into the disengaging zone without contacting the heat exchange means.

Referring now to the drawings which are merely for the purpose of illustrating the invention and not for limiting same, FIG. 1 is a schematic diagram of a fluid bed reactor in accordance with the present invention. Fluid bed reactor 10 includes a vertically disposed elongated vessel 12 having a conically-shaped bottom 14. Vessel 12 and its bottom 14 can be made of mild steel provided that the reactants introduced into the fluidized bed are non-corrosive and/or are not heated to unduly high temperature. The nature of the reactants involved in the process will dictate the material out of which the vessel and other auxiliary equipment is made. Fresh particulate material stored in hopper 18 is fed to fluidized bed 16 via rotary valve 20 and particulate material inlet port 22. Treated particulate material is removed from fluidized bed 16 via particulate material port 24 and valve 26 and is sent to product storage.

The apex of conically-shaped bottom 14 of reactor 10 is provided with a venturi tube 28 that is controlled by plug-type valve 30. Fluidizing gas is introduced to reactor 10 from a blower (not shown in the drawings) through pipe 32, independently controlled valve 34 and conduit 36.

As shown in FIG. 1, fluid bed reactor 10 defines a particulate material and gas disengaging zone A and a fluidizing zone B. Particulate material carried from fluidized bed 16 is disengaged from the fluidizing gas and carbon monoxide generated by the decomposition of metal carbonyl in zone A and drops back to fluidized bed 16. Within fluidizing zone B, which confines the fluidized bed 16, there is established an upper particulate-material-treating region C and a lower heat-exchanging region D. Region D can be established by mounting heat exchange coils 38 in the lower portion of fluidized bed 16. Heat exchange coils 38 can be either cooling coils or heating coils that are made of, or coated with, an abrasion-resistant material. Treating region C is that portion of the fluidized bed 16 where particulate material is treated with fluid substances, as described in greater detail hereinafter. Fluid substances, from a source not shown in the drawings, are pumped, either in concentrated or diluted form, by pump 40 through valve 42 into fluidized bed 16 via fluid inlet 44 and outwardly and upwardly flaring nozzle 46. Since all gaseous reagents, including the fluidizing gas and the fluid substance, travel substantially upwardly, the fluid substance does not come in contact with heat exchange coils 38, and, therefore, the problems of deposition or of accretion on coils 38 heretofore encountered are avoided. Advantageously, nozzle 44 is concentrically mounted on the vertical axis of reactor 10 or at least a sufficient distance from the walls of the reactor to minimize accretion buildup thereon. As a further embodiment, fluid inlet 44 and nozzle 46 are constructed to be independently temperature controlled so that the fluid substance can be maintained either above or below the reaction temperature before it is discharged into fluidized bed 16.

Apparatus in accordance with the present invention is particularly useful for decomposing metal compounds that are heat decomposable to metal. Compounds that can be heat decomposed to metal include, although the invention is not limited thereto, the carbonyls of nickel, cobalt and iron, nitrosyls or nitrosyl carbonyls of copper and cobalt, hydrides of tin and antimony, and metal alkyls, such as chromyl chloride. If a reducing gas, such as hydrogen, is employed as the fluidizing gas, volatile halides of copper, nickel, cobalt and iron can also be reduced in the apparatus of the present invention. Of course, the apparatus can be operated with cooling coils so that fluid substances can be condensed and solidified upon particulate material in fluidized bed 16 to provide the cooled particulate material with a solidified coating.

The apparatus, however, presently finds its greatest use in the thermal decomposition of metal carbonyls, and for this purpose the apparatus depicted in FIG. 2 is advantageously employed. Reactor 60 comprises a vertically disposed, elongated cylindrical mild steel shell 62, which as shown in FIG. 2, can consist of a plurality of cylindrical sections 64 having flanged ends 66. Sections 64 are assembled to provide a gas-tight chamber by placing gaskets 68 between flanges 66 before securing sections 64 with a plurality of bolts 70.

Reactor 60 is provided with a gas distribution plate 72 which can be multiperforate to insure uniform fluidizing gas distribution (not shown in the drawings) or can be constructed to receive fluidizing tuyeres 74 which function to provide uniform gas distribution while minimizing backflow of particulate material into plenum chamber 76. Fluidizing gas is introduced into plenum chamber 76 through port 78 from a source and a compressor not shown in the drawing. Particulate material that flows back to plenum chamber 76 is periodically removed through valved drain 80.

As described hereinbefore in conjunction with FIG. 1, a disengaging zone A and a fluidizing zone B are established in reactor 60 depicted in FIG. 2. In disengaging zone A after a large proportion of entrained particulate material has fallen back to fluidized bed 82, spent fluidizing gas is discharged through gas outlet 84 for further treatment to recover entrained particulate material and subsequent purification preparatory to being recycled to reactor 60.

When reactor 60 is employed to decompose metal carbonyls, heating region E and decomposing region F are established within fluidized bed 82 in fluidizing zone B. Heating coils 85, which can be abrasion-resistant-coated, hollow tubes through which heated liquids or gases are passed or electrical resistance coils that are coated with an abrasion resistant material, are fixedly mounted in region E of fluidized bed 82. Metal carbonyls are introduced into the decomposing region F through water-cooled tuyere 86. Advantageously, heating region E and decomposing region F are volumetrically proportioned, taking into account the volume displaced by heating coils 85 in heating region E, so that the velocity of the fluidizing gas plus gases added and generated in situ in the decomposing region F is substantially equal to the velocity of fluidizing gas in the heating region E whereby flow of particulate material between these regions, and therefore heat control, is established. Seed material or particulate material to be coated is fed to fluidized bed 82 through solids port 88 from a hopper and feed valve not shown on FIG. 2. Product, either coated powder or metal powder, is withdrawn from fluidized bed 82 through product drain 90.

In employing the apparatus in accordance with the present invention, a lower heating region and an upper treating region is established in a fluidized bed of particulate material. The particulate material is heated to a preselected temperature in the heating region. A reactive vapor is introduced at a temperature below which it reacts into the treating region whereby the reactive vapor reacts with the particulate material in the treating region without entering the heating region.

More specifically, when the apparatus in accordance with the present invention is employed for decomposing at least one metal carbonyl selected from the group consisting of nickel, cobalt and iron, a fluidized bed of particulate material, which can be of the metal being decomposed or a particulate material to be coated, is established. A heating region is established in the lower portion of the fluidized bed to heat the particulate material to at least the metal carbonyl decomposition temperature. An upper decomposing region is established within the fluidized bed, and the metal carbonyl is introduced into the decomposing region through a water-cooled lance so that the metal carbonyl is decomposed on the particulate material that was heated in the heating region. When the process is conducted on a continuous basis, seed material or fresh material to be coated is continually added to the fluidized bed at a predetermined rate while product is removed from the fluidized bed at a corresponding rate. Recycle of fines for seed material, as well as the rate at which material is removed from the reactor, is selected primarily to the bed depth and not in response to heat requirements.

When decomposing at least one metal carbonyl of a metal selected from the group consisting of nickel, cobalt and iron, a fluidized bed of particulate material is formed and an upper decomposing zone and a lower heating zone are established within the fluidized bed. The particulate material in the decomposing region is maintained at a temperature between about 300°F. and 500°F., advantageously 400°F. to 450°F., for nickel, and 400°F. and 600°F., advantageously 450°F. and 525°F., for iron. In most instances, these temperatures can be maintained by heating particulate material in the heating region to a temperature between about 25°F. and 200°F., advantageously between about 50°F. and 100°F., (advantageously the temperature differential for decomposing nickel carbonyl is 50°F. and about 100°F. for iron pentacarbonyl) above the temperature maintained within the decomposing region. When apparatus and process in accordance with the present invention are employed in conjunction with an overall process for forming a mixture of nickel and iron carbonyls, which mixture is collected in liquid iron pentacarbonyl and then fractionally distilled, the metal carbonyls do not have to be completely decomposed (i.e., less than 99 percent, e.g., less than 90 percent decomposition) since the off-gases can be employed for fractional distillation if iron pentacarbonyl is incompletely decomposed or collected in liquid iron pentacarbonyl if nickel carbonyl is incompletely decomposed. Gaseous metal carbonyl, advantageously fed through a water-cooled lance 86, is introduced to the decomposing region at a temperature below its decomposition temperature. Advantageously, the gaseous metal carbonyl is diluted with an inert gas, such as hydrogen or carbon monoxide. It is most advantageous to use carbon monoxide as the diluent gas since one of the products of reaction is carbon monoxide and subsequent steps to remove carbon monoxide from other diluents is thereby not required. When diluting gaseous metal carbonyls with diluents, commercial production rates, process control and substantially complete decomposition are obtained by using metal carbonyl concentrations in the range between about 100 grams per standard cubic meter and 2,477 grams per standard cubic meter, advantageously, metal carbonyl concentrations as high as possible, and even liquid metal carbonyls, are employed to provide the highest possible production rates and to lower the risk of forming elemental carbon, particularly when decomposing iron pentacarbonyl.

For the purpose of giving those skilled in the art a better appreciation of the advantages of the invention, the following illustrative examples are given:

EXAMPLE I

A fluidized bed of 1,170 pounds of nickel particles were fluidized by 77 standard cubic feet per minute of carbon monoxide compressed to 14 pounds per square inch gauge and preheated to 400°F. in a reactor similar to that depicted in FIG. 2 with a diameter of 14 inches. A heating region was established in the lower part of the fluidizing zone by heat exchange tubes through which a heated organic fluid was passed to heat the fluidized bed to 400°F. In a decomposing region immediately above the heating region in the fluidized bed, 12 standard cubic feet per minute of carbon monoxide containing 405 grams of nickel per standard cubic meter (16 percent nickel carbonyl by volume) was introduced into the fluidized bed through a water-cooled tuyere. During a 12 hour operating period the nickel carbonyl feed rate averaged 22 pounds of nickel per hour, the organic fluid temperature averaged 471°F. and the fluidized bed temperature averaged 422°F. in the decomposing region and averaged 451°F. in the heating region. Effluent gases from the fluidized bed contained 2.0 grams of nickel per standard cubic meter for a decomposition efficiency of 96.7 percent. During the test, 200 pounds of bed were removed and 46 pounds of minus 48 mesh fraction plus 10 pounds of impure nickel cyclone dust were added to the unit for size control. The chemical and physical analyses of the seed and final bed are shown in Table I:

TABLE I

| | Assay, Ni | % Fe | +28 | −28 +35 | −35 +48 | Tyler Particle Size, Wt, % −48 +65 | −65 +100 | −100 +200 | −200 +325 | −325 | Bulk Density lbs/ft³ |
|---|---|---|---|---|---|---|---|---|---|---|---|
| Seed | 89.9 | 0.81 | nil | 0.3 | 0.4 | 0.8 | 33.5 | 60.3 | 3.4 | 1.3 | — |
| Final | 99.1 | 0.08 | 0.05 | 22.5 | 47.8 | 19.7 | 8.7 | 1.2 | 0.1 | 0.05 | 355 |

EXAMPLE II

This example confirms that iron particles can be coated with a ferronickel alloy by employing the process in accordance with the present invention.

A fluid bed reactor, 14 inches in diameter, similar to that depicted in FIG. 2 was equipped with electric resistance heating coils. A fluidized bed of sponge iron was established with 995 pounds of particulate sponge iron which was fluidized with 40 standard cubic feet per minute of carbon monoxide compressed to 13 pounds per square inch gauge and preheated to 347°F. The fluidized bed was heated to 500°F. in the heating region within the fluidized bed prior to admitting 27.3 standard cubic feet per minute of carbon monoxide containing 120 grams nickel per standard cubic meter (5 percent nickel carbonyl by volume) and 355 grams iron per standard cubic meter (15 percent iron pentacarbonyl by volume) through a water-cooled tuyere. During the operating period of 3½ hours the feed rate averaged 56 pounds of nickel plus iron per hour, the temperature of the heating region averaged 590°F. and the temperature of the decomposing region averaged 519°F. The effluent gases exiting from the fluidized bed contained 0.31 grams iron per standard cubic meter and 0.05 grams nickel per standard cubic meter for decomposition efficiencies of iron and nickel of 99.7 percent and 99.9 percent, respectively. The chemical and physical analyses of the final bed are shown in Table II:

TABLE II

| | Assay, Ni | % C | +48 | Tyler Particle Size, Wt. % −48 +65 | −65 +100 | −100 +200 | −200 +325 | −325 |
|---|---|---|---|---|---|---|---|---|
| Final Bed | 3.82 | 0.96 | 0.4 | 12.3 | 21.6 | 51.9 | 9.3 | 4.5 |

EXAMPLE III

This example confirms that iron pentacarbonyl can be decomposed in a fluid bed reactor similar to that depicted in FIG. 2. The reactor had an internal diameter of 5 inches and was provided with electrical resistance heaters.

A fluidized bed of 110 pounds of ferronickel plated sponge iron, prepared as described in Example II, was fluidized by 6.1 standard cubic feet per minute of carbon monoxide. The fluidized bed was heated to 400°F. by the electrical resistance heating elements prior to admitting 8.3 standard cubic feet per minute of carbon monoxide containing 152 grams iron per standard cubic meter (6.4 percent) iron pentacarbonyl by volume) through a water-cooled tuyere. During an operating period of 48 hours, the feed rate averaged 5 pounds of iron per hour and the decomposing region of the fluidized bed averaged 440°F. The effluent gases contained 6.3 grams iron per standard cubic meter for decomposition efficiencies of 92 percent. During the test, 294 pounds of product were removed and 126 pounds of minus 65 mesh fraction plus 22 pounds of sponge iron seed were added to the unit for size control. The plated iron contained 1.8 percent carbon on an overall balance. The chemical and physical analyses of the seed, final bed and product are shown in Table III.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A fluid bed reactor for decomposing metal carbonyls which comprises a vertically disposed, elongated vessel that defines a lower fluidizing zone for confining a fluidized bed of particulate material and an upper particulate material and gas disengaging zone with the fluidizing zone having a lower heating region and an upper decomposing region, a plenum character having a multiperforate plate common with the bottom of the heating region of the fluidizing zone and through which fluidizing gas is introduced into said zone for fluidizing the particulate material contained therein, inlet and outlet means for feeding and discharging particulate material to and from the fluidizing zone, a fluidizing gas inlet for introducing fluidizing gas into the plenum chamber, heat exchange means mounted in the heating region to heat particulate material to the decomposition temperature of the metal carbonyl, a vertically disposed water cooled lance passing centrally through the heating zone and discharging into the lower end of the decomposition region for introducing metal carbonyl into the decomposing region so that metal carbonyl is decomposed on heated particulate material, generating carbon monoxide, the heating region and the decomposing region of the fluidizing zone being volumetrically proportioned so that the velocity of the fluidizing gas in the heating region is substantially equal to the velocity of the fluidizing gas plus the generated carbon monoxide in the decomposing region whereby conveyance of particulate material between the heating region and the decomposing region is promoted.

2. The fluid bed reactor as described in claim 1 wherein the heat exchange means is a hollow tube through which heated fluid is passed to heat particulate material in the heating region.

3. The fluid bed reactor as described in claim 1 wherein the heating means is an electrical resistance heater for heating particulate material in the heating region.

* * * * *

TABLE III

| | Assay, Ni | % C | +28 | −28 +35 | −35 +48 | Tyler Particle Size, Wt, % −48 +65 | −65 +100 | −100 +200 | −200 +325 | −325 | Bulk Density lbs/ft³ |
|---|---|---|---|---|---|---|---|---|---|---|---|
| Seed | 0.14 | 0.11 | — | — | 0.1 | 44.4 | 40.7 | 14.0 | 0.4 | 0.4 | 202 |
| Final Bed | 1.76 | 1.65 | 0.2 | 4.9 | 26.5 | 57.7 | 10.1 | 0.6 | — | — | 317 |
| Product | 2.44 | 1.73 | 0.4 | 3.9 | 35.2 | 55.5 | 4.8 | 0.2 | — | — | 309 |